US006502716B1

(12) United States Patent
Kolesar

(10) Patent No.: US 6,502,716 B1
(45) Date of Patent: Jan. 7, 2003

(54) DUCT CORNER DISPENSER AND METHOD OF DISPENSING DUCT CORNERS

(76) Inventor: John R. Kolesar, 4505 Eliza St., West Mifflin, PA (US) 15122

( * ) Notice: Subject to any disclaimer, the term of this patent is extended or adjusted under 35 U.S.C. 154(b) by 73 days.

(21) Appl. No.: 09/829,608

(22) Filed: Apr. 10, 2001

(51) Int. Cl.[7] ............................................... B65G 59/00
(52) U.S. Cl. ........................................... 221/1; 285/424
(58) Field of Search ............................ 221/1, 258, 268, 221/272; 285/424, 363, 412; 29/701, 248, 252

(56) References Cited

U.S. PATENT DOCUMENTS

| 3,712,650 A | 1/1973 | Mez |
| 4,398,334 A | 8/1983 | Kovalevich |
| 4,466,641 A | 8/1984 | Heilman et al. |
| 4,507,836 A | 4/1985 | Hiromitsu |
| 4,508,376 A | 4/1985 | Arnoldt |
| 4,542,923 A | 9/1985 | La Crosse et al. |
| 4,564,227 A | 1/1986 | Murck |
| 4,566,724 A | 1/1986 | Arnoldt et al. |
| 4,584,756 A | 4/1986 | Arnoldt |
| 4,725,083 A | 2/1988 | Schauer |
| 4,870,749 A | 10/1989 | Roy et al. |
| 5,005,879 A | 4/1991 | Jackson |
| 5,054,823 A | 10/1991 | Arnoldt |
| 5,069,484 A | 12/1991 | McElroy |
| 5,090,101 A | 2/1992 | Welty |
| 5,165,730 A | 11/1992 | McElroy |
| 5,283,944 A | 2/1994 | Goodhue |
| 5,321,880 A | 6/1994 | Goodhue |
| 5,342,100 A | 8/1994 | Goodhue |
| 5,356,184 A | 10/1994 | Hunter |
| 5,448,815 A | 9/1995 | Kolesar |
| 5,926,937 A | 7/1999 | Goodhue |

OTHER PUBLICATIONS

Complaint—United States District Court For the District of Maryland, Systemation, Inc. vs. Ward Industries, Inc. and Capitol Mechanical contractors, Inc.

*Primary Examiner*—Kenneth W. Noland
(74) *Attorney, Agent, or Firm*—Kirkpatrick & Lockhart LLP

(57) ABSTRACT

Apparatus and method for dispensing L-shaped duct connectors. The apparatus supports a stack of nested L-shaped connectors and includes a separator for causing the second bottommost connector to be biased out of nesting engagement with the first bottommost connector in the stack upon the application of an advancement force to the first bottommost connector. The apparatus includes an advancement assembly for selectively advancing the first bottommost connector to an installation position wherein it may be installed in a C-shaped flange attached to a duct segment. After the first bottommost connector is moved to the installation position, the second bottommost connector then moves under the influence of gravity to a position wherein it can be advanced to the installation position.

21 Claims, 9 Drawing Sheets

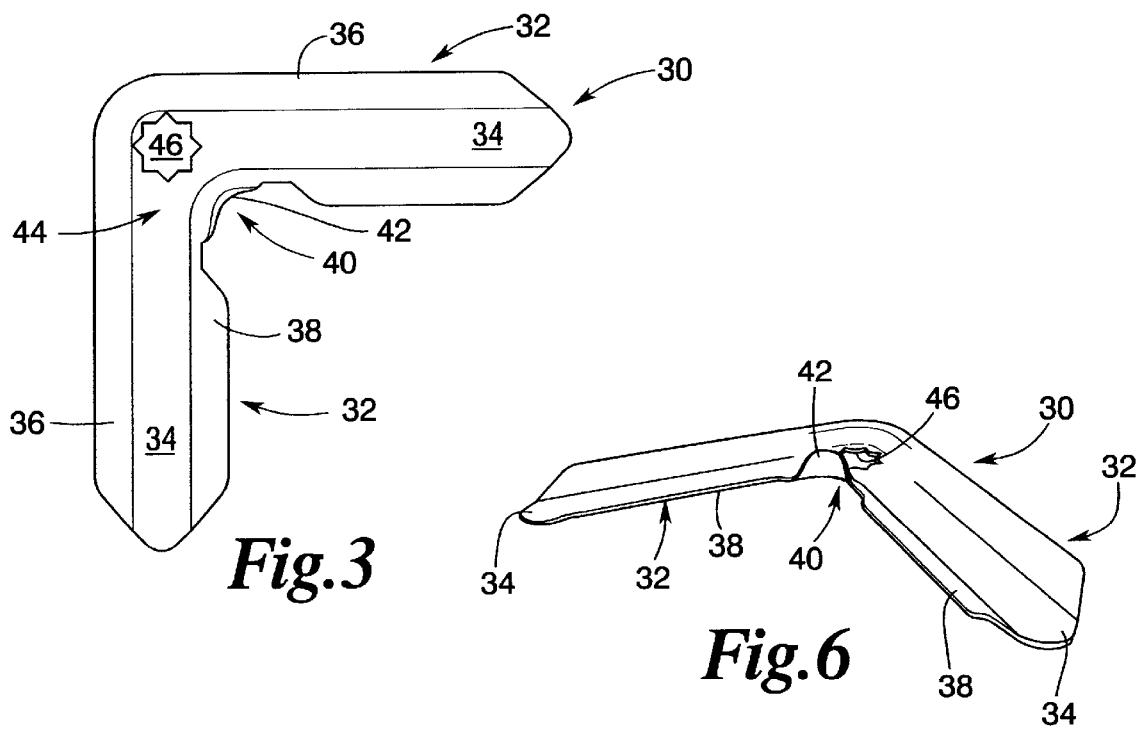
Fig.3
Fig.6
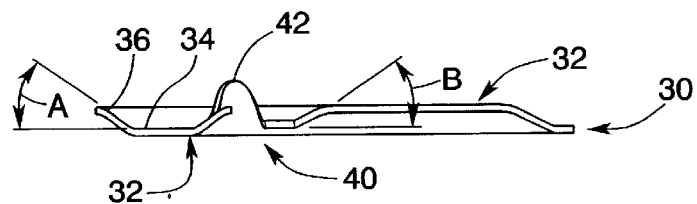
Fig.5
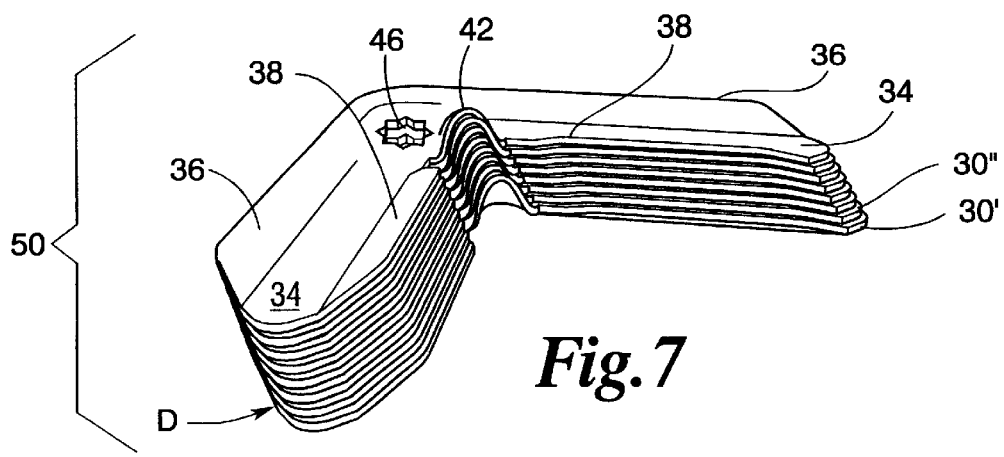
Fig.7

DUCT CORNER DISPENSER AND METHOD OF DISPENSING DUCT CORNERS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to assembly apparatuses and methods and, more particularly, is directed to apparatuses and methods for dispensing L-shaped duct connectors from a vertical stack of connectors to enable the connectors to be sequentially laterally advanced to a position wherein they may be installed in flanges provided at the end of duct sections.

2. Description of the Invention Background

In the heating, ventilation, and air conditioning industry, ducts fabricated from various types of sheet metal materials are typically used to transport conditioned air throughout factories, office buildings and other structures. One could surmise that perhaps there are collectively thousands of miles of such ducts in such structures throughout the world.

Typical heating, ventilation and air conditioning duct arrangements comprise rectangular-shaped elongated hollow sections that are fastened together at their ends to form a single duct assembly. It has been found that such "sectional" duct assemblies are more structurally sound than a single non-sectional duct of similar length. In such sectional duct assemblies, the duct sections must be perfectly aligned to prevent the duct assembly from buckling and to enable airtight seals to be established and maintained between each duct section.

Over the years, a variety of different "flange-type" joint assembly arrangements have been developed for connecting adjacent ends of rectangular sheet metal ducts. One method that is commonly employed consists of affixing or forming sections of C-shaped channels around the perimeter of each duct adjacent to their open ends. Thereafter, L-shaped corners or connector plates are then inserted into the channels at each corner of the duct. The duct sections are then abutted together and bolts are inserted through openings in the abutting L-shaped connectors to fasten the duct sections together.

The method of positioning and installing the L-shaped connectors into the channels can be time consuming when performed manually. The assembly apparatus and method disclosed in U.S. Pat. Nos. 5,283,944 and 5,321,880, respectively purport to automate the installation of connectors into the channels formed on the end of duct segments. However, that apparatus and method require the use of special connectors that must be formed with upstanding protrusions for preventing the connectors from nesting when they are arranged in a vertical stack for dispensing purposes. The formation of such protrusions increase the costs associated with fabricating the connectors and, therefore, undesirably contribute to the overall expense of the duct system.

There is a need for an apparatus and method for dispensing L-shaped duct connectors from a vertical stack of connectors to enable the connectors to be sequentially laterally advanced to a position wherein they may be installed in flanges provided at the end of duct sections without requiring the use of expensive connectors that are formed with upstanding protrusions to prevent the connectors from nesting together.

BRIEF SUMMARY OF THE INVENTION

In accordance with one form of the present invention, there is provided apparatus for sequentially dispensing L-shaped connectors from a stack of nested L-shaped connectors. In one embodiment, the apparatus comprises a hopper for supporting the stack of nested L-shaped connectors and a separator oriented for engagement with a second L-shaped connector in the stack that is in nested engagement with a first bottommost L-shaped connector in the stack. The separator is so oriented such that, upon application of a lateral force to the first bottommost L-shaped connector when in a restrained position, the separator is contacted by second L-shaped connector to move the second L-shaped connector out of nested engagement with the first bottommost L-shaped connector and thereby permit the first bottommost connector to be laterally advanced out of the restrained position. Thereafter, the separator then permits the second L-shaped connector to move to the restrained position.

Another embodiment of the present invention comprises an apparatus for sequentially dispensing and moving L-shaped connectors from a stack of nested L-shaped connectors to installation positions above corresponding C-shaped channel flanges attached to duct segments. The apparatus includes a base and a hopper that is attached to the base. The hopper is sized to support a stack of nested L-shaped connectors. In addition, the apparatus includes a separator that is oriented for engagement with a second L-shaped connector in the stack that is in nested engagement with a first bottommost L-shaped connector in the stack. The separator is so oriented such that, upon application of a lateral force to the first bottommost L-shaped connector when in an restrained position, the second L-shaped connector contacts the separator to thereby move the second L-shaped connector out of nested engagement with the first bottommost L-shaped connector to permit the first bottommost connector to be laterally advanced out of the restrained position. The separator further permits the second L-shaped connector to move to the retrained position. In addition, the apparatus includes an advancement assembly that is attached to the base. The advancement assembly selectively advances the first bottommost connector from the restrained position to the installation position.

Still another embodiment of the present invention comprises a method of sequentially dispensing L-shaped connectors from a stack of nested L-shaped connectors. The method includes orienting a plurality of L-shaped connectors in a stack such that each L-shaped connector is in nesting engagement with at least one adjacent L-shaped connector within the stack. The method further includes moving a second bottommost L-shaped connector in the stack from nesting engagement with a first bottommost connector in the stack and applying a lateral force to the first bottommost connector.

It is a feature of the present invention to provide apparatuses and methods that can be effectively used to automatically advance L-shaped connectors out of a stack of nested L-shaped connectors to positions wherein they can be installed in C-shaped flanges attached to duct segments. Accordingly, the present invention provides solutions to the shortcomings of prior automated corner installation devices that require the use of special connectors. Those of ordinary skill in the art will readily appreciate, however, that these and other details, features and advantages will become further apparent as the following detailed description of the embodiments proceeds.

BRIEF DESCRIPTION OF THE SEVERAL VIEWS OF THE DRAWING

In the accompanying Figures, there are shown present embodiments of the invention wherein like reference numerals are employed to designate like parts and wherein:

FIG. 3 is a top view of a connector;

FIG. 5 is front elevational view of the connector of FIGS. 3 and 4;

FIG. 6 is a perspective view of the connector of FIGS. 3–5;

FIG. 7 is a perspective view of a stack of nested connectors;

DETAILED DESCRIPTION OF THE EMBODIMENTS OF THE INVENTION

Figure 1:
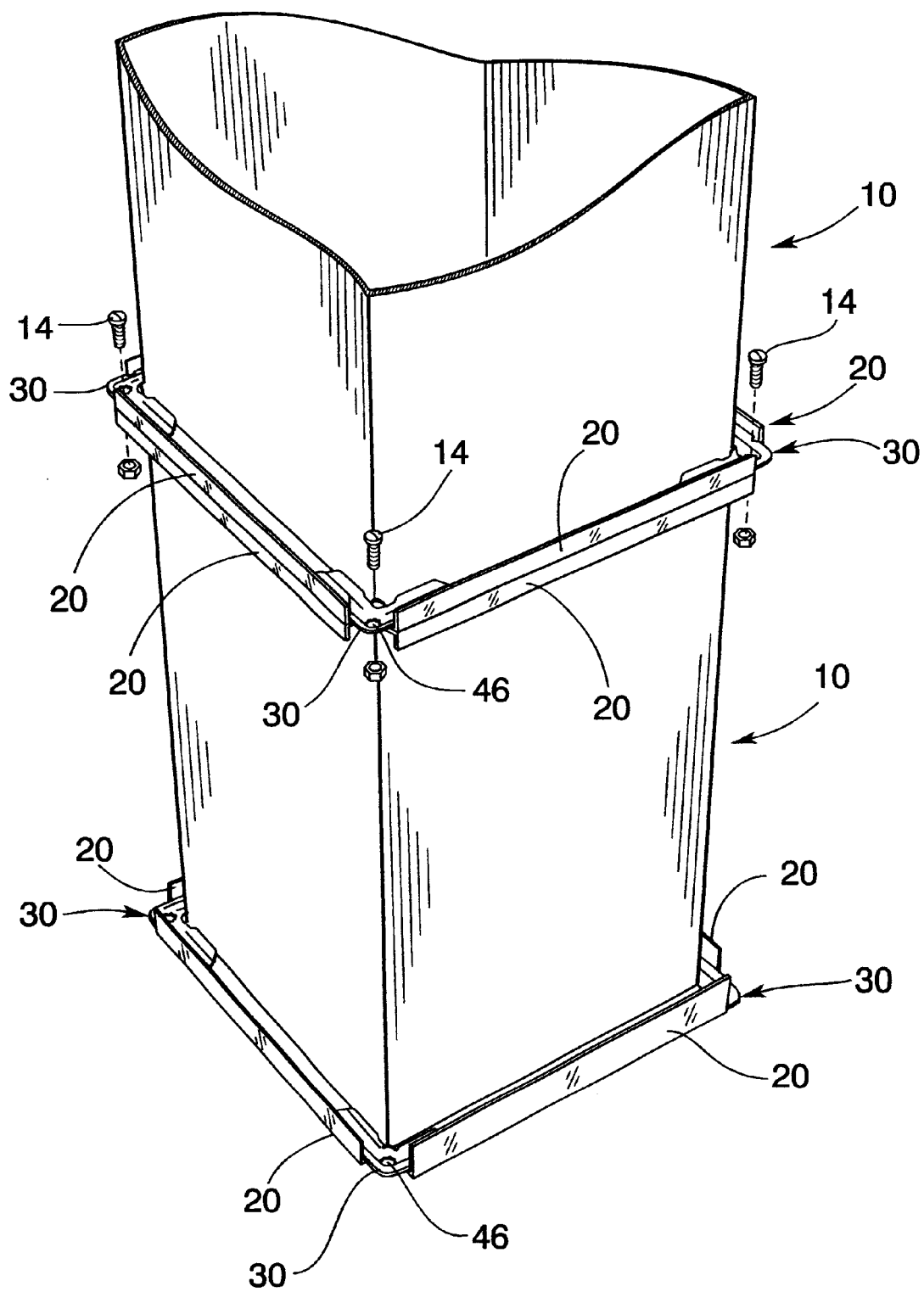
FIG. 1 is a perspective view of two interconnected duct segments.

Referring now to the drawings for the purposes of illustrating the present preferred embodiments of the invention only and not for the purposes of limiting the same, FIG. 1 depicts two rectangular duct segments 10 that have a plurality of C-shaped flanges 20 attached to or formed around the perimeter of each duct segment 10 adjacent each open end thereof. As will be discussed in further detail below, an L-shaped connector 30 is pressed into the C-shaped flanges at each corner of each duct segment 10. When the duct segments 10 are axially aligned as shown in FIG. 1, the connectors 30 in one duct segment are arranged in back-to-back fashion with corresponding connectors 30 in the other duct segment 10. The duct segments 10 are then interconnected together by bolts 14 that extend through the aligned apertures 46 in the back-to-back aligned L-shaped connectors 30.

Figure 2:
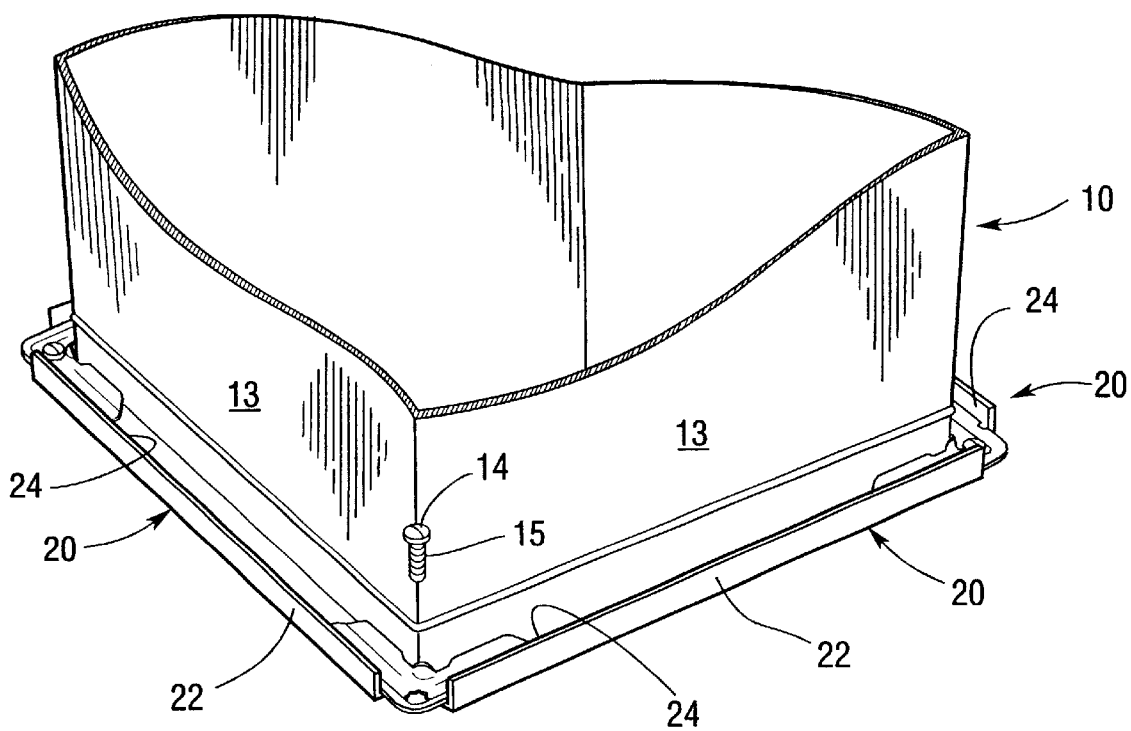
FIG. 2 is an enlarged view of one end of a duct segment showing connectors installed in the flanges.
Figure 4:
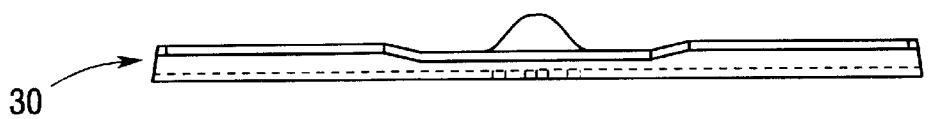
FIG. 4 is rear elevational view of the connector of FIG. 3.
Figure 8:
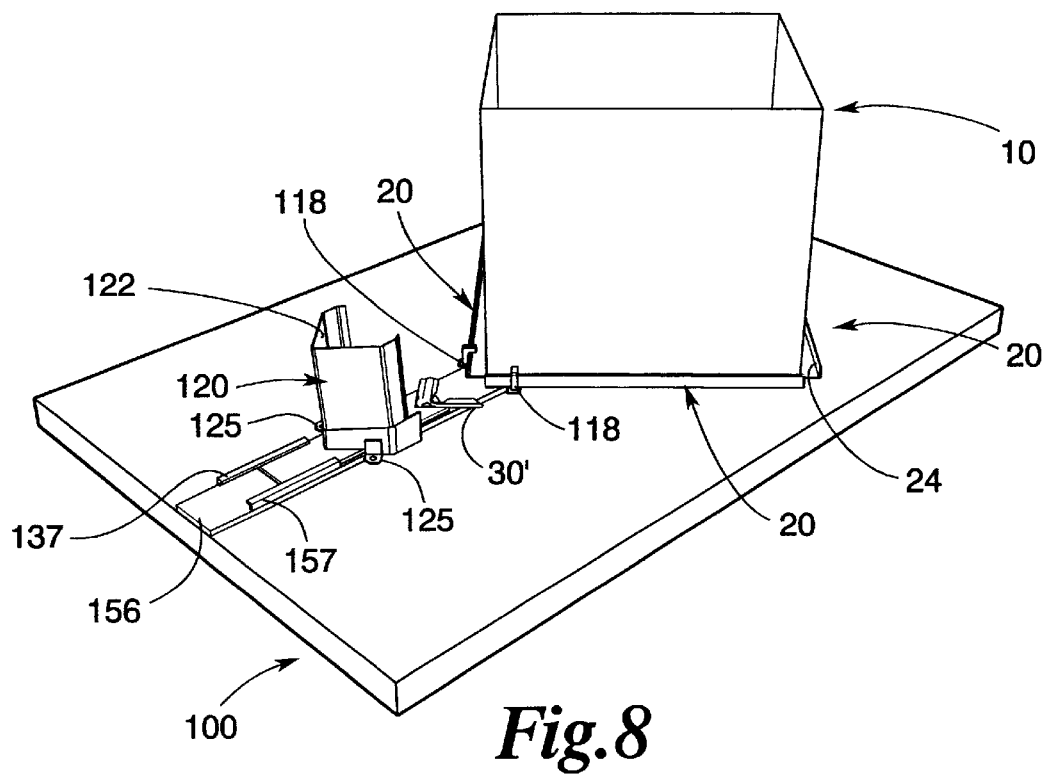
FIG. 8 is a perspective view of an assembly apparatus employing a hopper of the present invention.

As can be seen in FIG. 2, the C-shaped flanges 20 may comprise a C-shaped member fabricated from sheet metal that is attached to the duct segment 10 by appropriate fastening means such as screws, rivets, welds, etc. One C-shaped member is attached to each lateral side of a duct segment 10 adjacent a corresponding open end of the duct segment 10. In the alternative, the C-shaped flanges 20 may be integrally formed around the perimeter of each duct segment 10 utilizing known metal forming processes. Regardless of which fabricating method is employed, the C-shaped flanges 20 each define an upstanding leg 22 that is spaced-apart from the duct wall 13 to define a leg-receiving channel 24.

FIGS. 3–6, depict one L-shaped connector embodiment that can be used in connection with the various embodiments of the present invention. More particularly and with reference to FIG. 3, a connector 30 includes two outwardly extending legs 32. Each leg 32 has a generally planar central portion 34 and an outer flange portion 36 that protrudes upward at an angle relative to the planar central portion 34. For example, angle "A" (shown in FIG. 5) may be approximately thirty degrees. Similarly, each leg 32 has an inner flange portion 38 that protrudes upward from the planar central portion 34. For example, angle "B" (shown in FIG. 5) may be approximately thirty degrees. As can be seen in FIG. 5, when viewed from an end, each leg 32 is somewhat "dish-shaped" in appearance. In this embodiment, each inner flange portion 38 converges at an inner corner 40 and forms an upwardly extending arcuate tab 42. Tab 42 may protrude upward from the portion of the connector wherein the planar central portions 34 of each leg 32 converge, designated as the corner portion 44. Also in this embodiment, a multi-cornered aperture 46 is provided through the corner area. The aperture 46 is sized and shaped to permit a bolt 14 with a squared shoulder portion 15 to extend therethrough. The squared shoulder portion 15 engages the multi-corners of the aperture 46 to prevent the bolt 14 from turning when a nut 16 is secured thereto. See FIG. 2.

FIG. 7 illustrates a stack 50 of nested connectors 30. As can be seen from that Figure, when arranged in a vertical stack 50, the connectors 30 "nest" together. As used herein, the term "nest" means that, when two or more connectors 30 are arranged in a stack 50 as shown in FIG. 7, the "first" or bottommost connector (designated as 30' in FIG. 7) in the stack 50 cannot be laterally advanced out of the stack 50 upon the application of a lateral force (represented by arrow "D" in FIG. 7) to the first bottommost connector 30' unless the next or "second" L-shaped connector (designated as 30" in FIG. 7) in the stack 50 that is in direct nested engagement with the first bottommost connector 30' is restrained and is at least partially biased upward out of nesting engagement with the first bottommost connector 30' to permit the first bottommost connector 30' to move laterally out of the stack 50 of connectors 30. Contrasting connectors 30 with the connectors employed in the apparatus and method disclosed in U.S. Pat. Nos. 5,284,944 and 5,321,880, respectively, the connectors described in those patents require the use of upwardly extending protrusions on each connector to prevent the connectors from nesting when arranged in a vertical stack.

Figure 10:
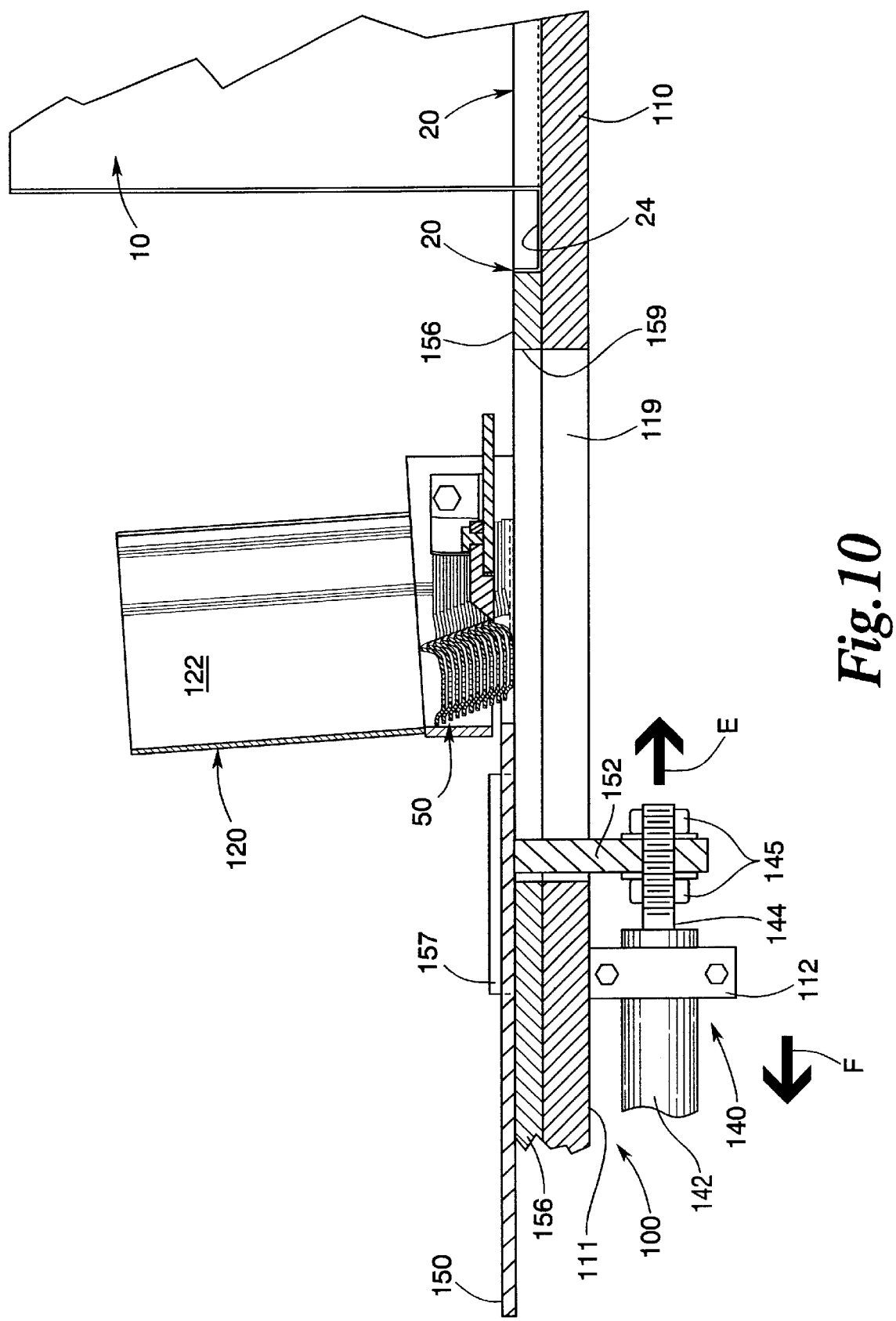
FIG. 10 is a cross-sectional elevational view of the assembly apparatus and stack of nested connectors supported in the hopper with the bottommost connector in a retrained position.
Figure 11:
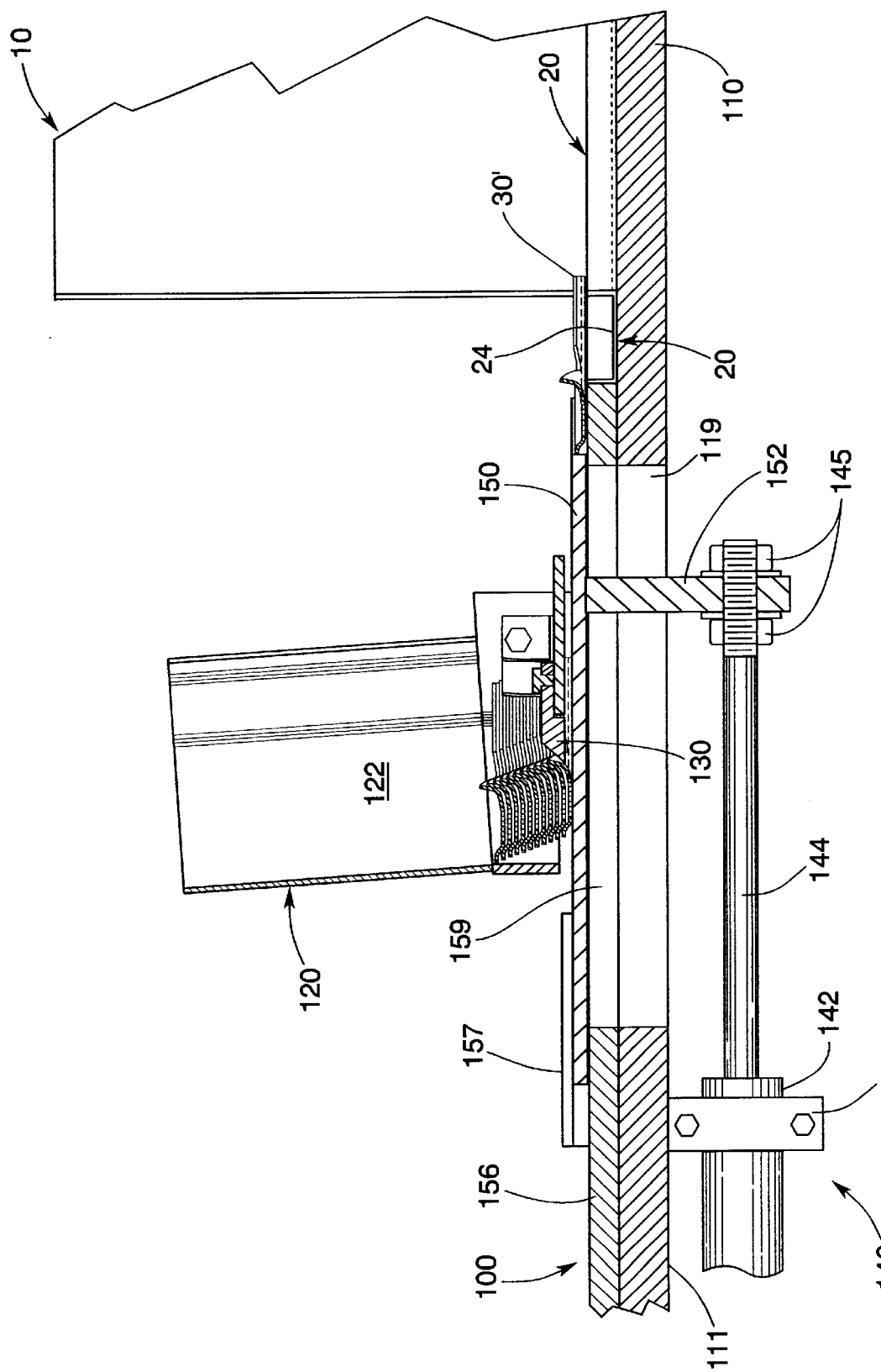
FIG. 11 is another cross-sectional elevational view of the assembly apparatus of FIG. 10, with the bottommost connector advanced to an installation position.
Figure 12:
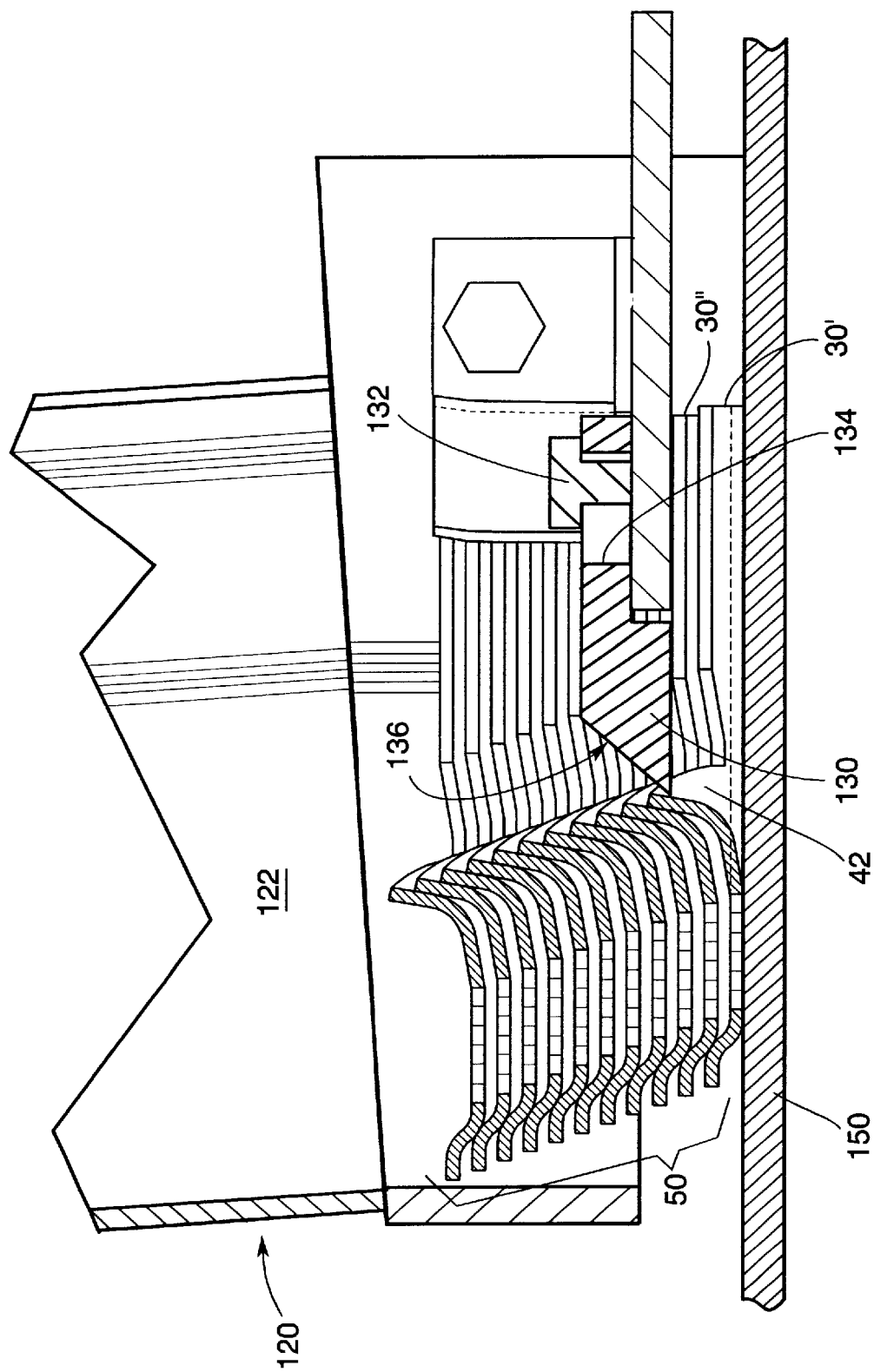
FIG. 12 is an enlarged cross-sectional elevational view assembly apparatus of FIG. 10.

Turning now to FIGS. 8–14, an assembly apparatus 100 is shown for automatically positioning connectors 30 above corresponding leg-receiving channels 24 in a duct segment 10. More particularly and with reference to FIGS. 13 and 14, there is shown an assembly apparatus 100 that includes a base 110 for supporting a duct segment 10. A hopper 120 is attached to the base member 110 by, for example, screws 129 that extend through holes 127 in mounting tabs 125. See FIGS. 9 and 13. The hopper 120 defines a vertically extending chute 122 for receiving a stack 50 of connectors 30 therein. As can be seen in FIG. 12, the stack 50 angles upward at an angle and the hopper 120 is also configured to accommodate such an angled stack of connectors 30.

Figure 13:
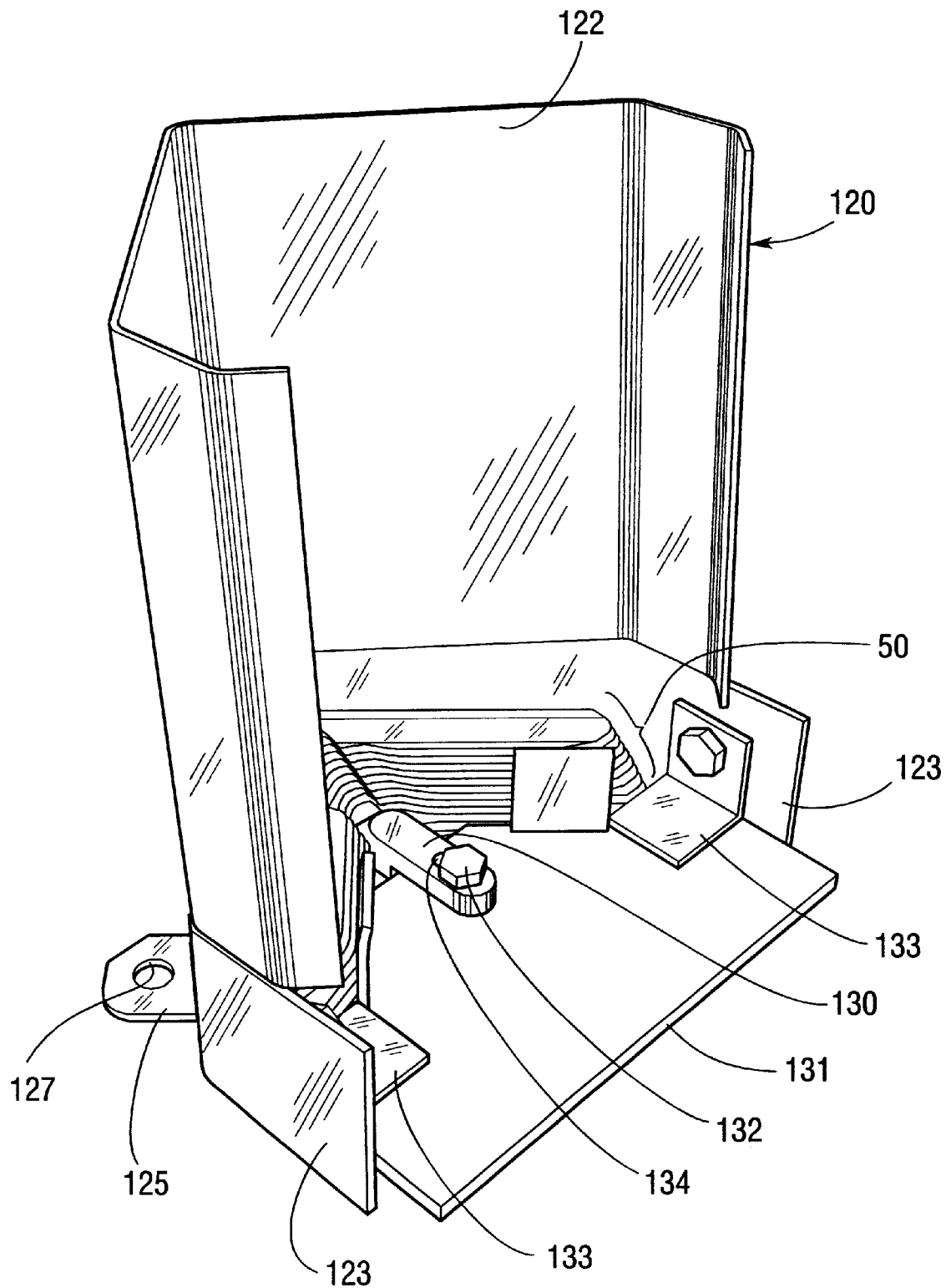
FIG. 13 is a perspective view of a hopper of the present invention supporting a stack of nested connectors therein.
Figure 14:
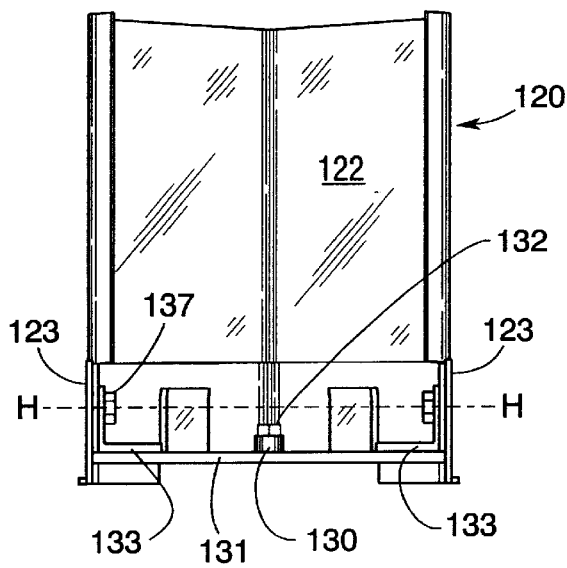
FIG. 14 is a front view of the hopper of FIG. 13.
Figure 15:
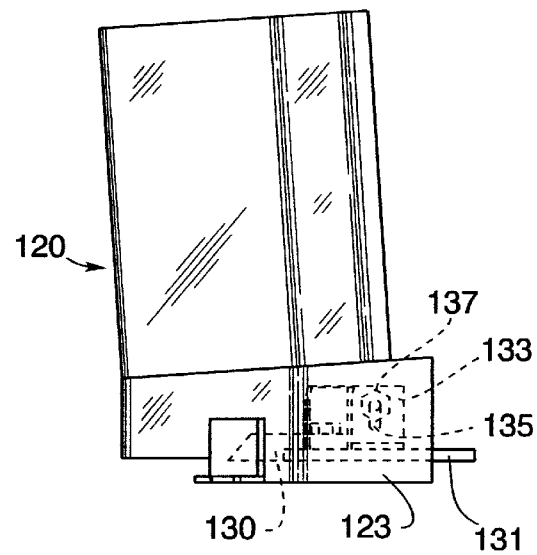
FIG. 15 is a left side elevational view of the hopper of FIGS. 13 and 14.
Figure 16:
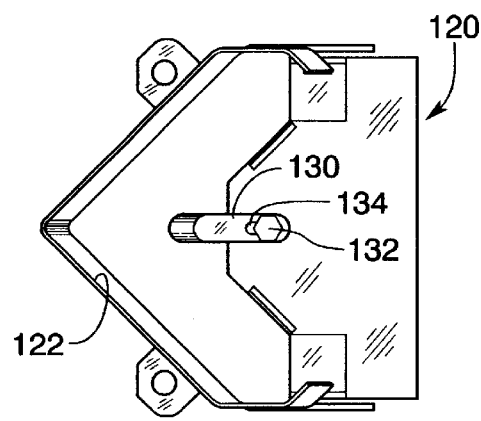
FIG. 16 is a top view of the hopper of FIGS. 13–15.

As can be seen in FIG. 12, the hopper 120 also includes a separator bar 130 that is attached to a bottom plate 131. As shown in FIGS. 13–15, the bottom plate 131 has two attachment tabs 133 affixed (welded, screwed, etc.) that facilitate attachment of the bottom plate 131 to upstanding walls 123 of the hopper 120. The attachment tabs maybe adjustably affixed to the upstanding walls 123 by screws 137 that extend through slots 135 in the attachment tabs 133. Such arrangement permits the height and angular position of the bottom plate about an axis H—H defined by the screws 137 to be selectively adjusted. However, those of ordinary skill in the art will appreciate that the bottom plate 131 may also be non-adjustably affixed to the upstanding walls 123 or other portions of the hopper 120. Also, to better support a portion of a stack of nested connectors 50, upstanding support tabs 139 may be attached (welded, screwed, etc.) to the bottom plate 131.

In this embodiment, the separator bar 130 is adjustably affixed to the bottom plate 131 by a screw 132 that extends through a slot 134 in the separator bar 130. However, those of ordinary skill in the art will appreciate that the separator bar 130 may be permanently affixed to the bottom plate 131 in a desired position as will be further described below. As can be seen in FIG. 12, the separator bar 130 has an engagement end 136 configured to engage the inner corner 40 of a connector 30 received in the hopper 120. In this embodiment, the engagement end 136 has a rounded shape and is angled for complementary engagement with the upstanding tab 42 on a connector 30 as will be discussed in further detail below.

Figure 9:
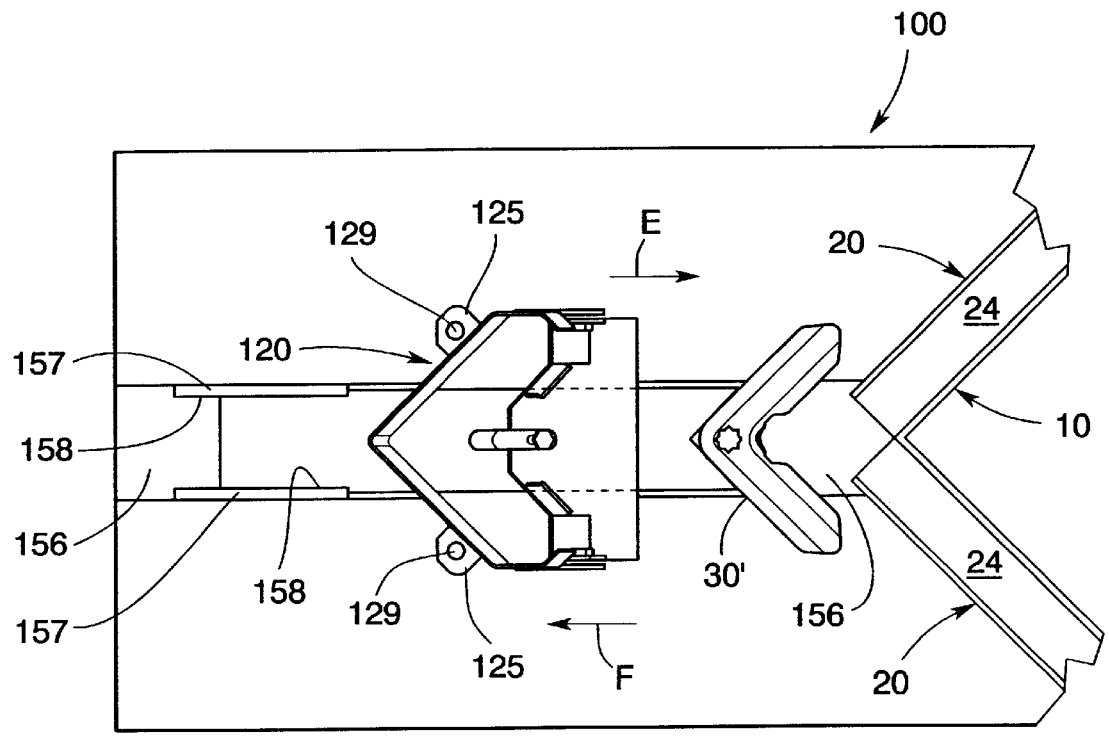
FIG. 9 is a top view of the assembly apparatus of FIG. 8.

FIG. 12, illustrates a "first" bottommost connector in a "restrained" position. As can be seen in FIG. 11, the "first" bottommost connector 30' in the stack 50 is advanced to an "installation" position above the leg-receiving channels 24 of C-shaped flanges 20 of a duct segment 10 that is supported on the base 110 adjacent the hopper 120 by an advancement assembly, generally designated as 140. In this embodiment, the advancement assembly 140 includes a conventional hydraulically or pneumatically powered advancement cylinder 142 that has an extendable and retractable piston 144. The advancement cylinder 142 may be mounted to the underside 111 of the base 110 by a conventional mounting bracket 112 as shown in FIGS. 10–12. A shifting plate 150 fabricated from steel or the like is attached to the end of the piston 144 by an attachment arm 152 that is received on the piston 144 and retained in position by a pair of nuts 145 that are threaded onto-the piston 144 as shown in FIGS. 10 and 11. Other methods for fastening the shifting plate 150 to the end of the piston 144 may be employed. In this embodiment, the shifting plate 150 is shaped as shown in FIG. 9, such that it is complementary to the shape of the L-shaped connectors 30 and can laterally advance the L-shaped connectors 30 in the direction depicted by arrow "E" in FIGS. 9 and 10. The shifting plate 150 is slidably supported on the base 110 by a guide plate 156 that supported on and attached to the base 110. The shifting plate is guided on the guide plate 156 by a pair of side members 157 that are attached to the base 110 and define a channel 158 in which the shifting plate 150 may reciprocate on the guide plate 156. The base 110 has an axial hole 119 therethrough that coincides with an axial hole 159 in the guide plate 156 to enable the attachment arm 152 to extend therethrough. When the shifting plate 150 laterally advances the bottommost connector 30' in the "E" direction as shown in FIGS. 9–11, the connector 30' is oriented above the C-shaped flanges 20 such that its legs 32 can be pressed into the leg-receiving channels 24 of the associated C-shaped flanges 20. See FIG. 11. Those of ordinary skill in the art will appreciate that when the connector 30' is positioned as shown in FIG. 11, its legs 32 may be pressed in to the leg-receiving channels 24 of the associated C-shaped flanges 20 either manually or with other automated equipment that is known in the art.

As can be seen in FIG. 12, when a stack 50 of connectors 30 is placed into the hopper 120, the spacer bar 130 is aligned to engage the upwardly extending tab 42 of the L-shaped connector 30" that is in nesting engagement with the bottommost connector 30'. As can be seen in FIG. 12, the term "bottommost" refers to the connector 30' that is at the bottom of the stack 50 and is aligned with the shifting plate 150 to be advanced to a position wherein it can be installed on the duct segment 10. A connector 30 that is "in nesting engagement" with a lower connector 30 means that if an axial force is applied to either connector 30, the connectors 30 would not separate axially without restraining the connector 30 that is not receiving the axial force and separating at least portions of the connectors 30 a sufficient amount to permit the connector 30 that is receiving the axial force to move relative to the restrained connector 30.

This embodiment of the automated advancement equipment 100 operates as follows. A stack 50 of nested L-shaped connectors 30 is placed into the hopper 120 as shown in FIGS. 12 and 13. A duct segment 10 is placed adjacent to the hopper 120 and is oriented in position by retainers 118 attached to the base 110. The advancement cylinder 142 may be controlled by a standard foot-operated or hand-operated switch (not shown) or, if the advancement assembly 140 is used in connection with other automated equipment, the control of the advancement cylinder 142 may be integrated into a larger control system. After the connectors 30 have been placed into the hopper 120 and a duct segment 10 is oriented in the installation position shown in FIG. 10, the operator activates the advancement cylinder 142 to cause the piston 144 to move in the "E" direction. See FIG. 11. This movement of the piston 144 in the "E" direction causes the shifting plate 150 to contact the bottommost connector (designated as 30') and start to axially advance the bottommost connector 30' in the "E" direction. When the shifting plate initially contacts the bottommost connector 30', the next connector (designated as 30") in the stack 50 that is nesting engagement with the bottommost connector 30' is also urged in the direction until the upstanding tab 42 of the next connector 30" contacts the engagement end 136 of the separator 130 which causes at least portions of the next connector 30" to separate from the corresponding portions of the bottommost connector 30' a sufficient distance to permit the bottommost connector 30' to be axially advanced to the installation position as shown in FIG. 11. Thereafter, the piston 144 is retracted in the "F" direction causing the shifting plate 150 to also move in the direction to a starting position. After the shifting plate 150 has resumed the starting position, the next connector 30 drops onto the guide plate 156 (under the influence of gravity) and becomes the next bottommost connector 30'. The duct segment 10 is then reoriented such that the remaining two C-shaped flanges 20 are adjacent to the hopper 120. The process is then repeated to advance the next bottommost connector 30' to a position wherein it can be pressed into the leg-receiving channels 24 of the other associated C-shaped flanges 20. Those of ordinary skill in the art will appreciate that multiple advancement apparatuses 100 may be employed to position connector plates 30 for insertion into the leg-receiving channels 24 on opposing corners of the duct segment 10 and on both ends of a duct segment 10 simultaneously. Such arrangement may be particularly advantageous when the apparatuses 100 are employed in connection with other conventional automated assembly equipment which may be used to press the legs 32 of the L-shaped connectors 30 into the leg-receiving channels 24 of the associated C-shaped flanges 20.

Thus, from the foregoing discussion, it is apparent that the present invention solves many of the problems encountered when utilizing prior assembly apparatuses for installing L-shaped connectors into the C-shaped flanges of duct segments. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. Apparatus for sequentially dispensing L-shaped connectors from a stack of nested L-shaped connectors, comprising:
   a hopper for supporting the stack of nested-L-shaped connectors; and
   a separator oriented for engagement with a second L-shaped connector in the stack that is in nested engagement with a first bottommost L-shaped connector in the stack such that, upon application of a lateral force to the first bottommost L-shaped connector when in a restrained position, the separator is contacted by second L-shaped connector to move the second L-shaped connector out of nested engagement with the first bottommost L-shaped connector to thereby permit the first bottommost connector to be laterally advanced out of the advancement position, said separator further permitting the second L-shaped connector to move to the restrained position.

2. The apparatus of claim 1 wherein each of the L-shaped connectors in the stack have an inner corner and wherein said inner corner of the second L-shaped connector contacts the separator which thereby lifts the second L-shaped connector out of nested engagement with the first bottommost L-shaped connector.

3. The apparatus of claim 1 wherein an upwardly extending tab is formed on the inner corner of each L-shaped connector and wherein said separator has an engagement end for engaging a portion of the upwardly extending tab of the second L-shaped connector.

4. The apparatus of claim 3, wherein each said upwardly extending tab has an arcuate portion and wherein said engagement end is rounded for engagement with the arcuate portion of the upwardly extending tab of the second L-shaped connector.

5. The apparatus of claim 1 wherein said separator is adjustably attached to said hopper.

6. The apparatus of claim 5 wherein said separator is attached to a bottom member that is adjustable attached to upstanding side wall portions of said hopper.

7. The apparatus of claim 6 wherein said bottom member may be selectively pivoted about an axis that extends transversely across the hopper between said upstanding side wall portions.

8. The apparatus of claim 6 wherein said bottom member comprises:
   a bottom plate;
   at least one attachment tab attached to said bottom plate, each said attachment tab having an aperture therethrough for receiving a corresponding fastener therethrough.

9. The apparatus of claim 8 wherein each said aperture comprises a slot.

10. The apparatus of claim 1 wherein said hopper further comprises a base member attached to a portion of said hopper and wherein said separator is adjustably attached to said base member.

11. The apparatus of claim 10 wherein said bottom member comprises:
   a bottom plate;
   at least one attachment tab attached to said bottom plate, each said attachment tab having an aperture therethrough for receiving a corresponding fastener therethrough.

12. The apparatus of claim 11 wherein each said aperture comprises a slot.

13. The apparatus of claim 12 wherein said separator has an axial slot therethrough for receiving a fastener for adjustably affixing said separator to said base member.

14. Apparatus for sequentially dispensing L-shaped connectors from a stack of nested L-shaped connectors, comprising:
   means for supporting the stack of nested L-shaped connectors; and
   means for engaging a second L-shaped connector in the stack that is in nested engagement with a first bottommost L-shaped connector in the stack such that, upon application of a lateral force to the first bottommost L-shaped connector, the first bottommost L-shaped connector is axially advanced out of the stack of nested L-shaped connectors.

15. The apparatus of claim 14 wherein each L-shaped connector has an inner corner portion and wherein said means for engaging engages the inner corner portion of the second L-shaped connector.

16. The apparatus of claim 15 wherein each L-shaped connector has an upstanding tab formed on the inner corner thereof and wherein said means for engaging engages the upstanding tab of the second L-shaped connector.

17. An apparatus for sequentially dispensing and moving L-shaped connectors from a stack of nested L-shaped connectors to installation positions above corresponding C-shaped channel flanges attached to duct segments, said apparatus comprising:
   a base;
   a hopper attached to said base and sized to support a stack of nested L-shaped connectors;
   a separator oriented for engagement with a second L-shaped connector in the stack that is in nested engagement with a first bottommost L-shaped connector in the stack such that, upon application of a lateral force to the first bottommost L-shaped connector when in a restrained position, the second L-shaped connector contacts the separator to thereby move the second L-shaped connector out of nested engagement with the first bottommost L-shaped connector to permit the first bottommost connector to be laterally advanced out of the advancement position, said separator further permitting the second L-shaped connector to move to the advancement position;
   an advancement assembly attached to said base, said advancement assembly selectively advancing the first bottommost connector from the retrained position to the installation position.

18. The apparatus of claim 17 wherein said advancement assembly comprises:
  a cylinder attached to said base, said cylinder having a selectively extendable and retractable piston; and
  a shifting plate attached to said extendable and retractable piston.

19. The apparatus of claim 17 further comprising a duct segment positioner attached to said base.

20. The apparatus of claim 18 wherein the stack of nested L-shaped connectors extends in an angle above said base and wherein said hopper is configured to accommodate the angled stack of nested L-shaped connectors.

21. A method of sequentially dispensing L-shaped connectors from a stack of nested L-shaped connectors, comprising:
  orienting a plurality of L-shaped connectors in a stack such that each L-shaped connector is in nesting engagement with adjacent L-shaped connectors within the stack;
  moving a second bottommost L-shaped connector in the stack from nesting engagement with a first bottommost connector in the stack;
  applying a lateral force to the first bottommost connector.

* * * * *